United States Patent
Machani et al.

(10) Patent No.: US 11,582,827 B2
(45) Date of Patent: Feb. 14, 2023

(54) ACCELERATING CONTROL PROCEDURES OVER BLE CONNECTION ORIENTED SERVICES

(71) Applicant: TEXAS INSTRUMENTS INCORPORATED, Dallas, TX (US)

(72) Inventors: Yaniv Machani, Kiryat Ono (IL); Lior Gersi, Kfar Saba (IL); Yaniv Weizman, Tel Aviv Jaffa (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/370,896

(22) Filed: Jul. 8, 2021

(65) Prior Publication Data

US 2022/0061119 A1 Feb. 24, 2022

Related U.S. Application Data

(60) Provisional application No. 63/067,185, filed on Aug. 18, 2020.

(51) Int. Cl.
*H04W 76/10* (2018.01)
*H04W 4/80* (2018.01)
*H04W 76/25* (2018.01)

(52) U.S. Cl.
CPC ............ *H04W 76/25* (2018.02); *H04W 4/80* (2018.02)

(58) Field of Classification Search
CPC ....... H04W 76/25; H04W 4/80; H04W 76/10; H03B 3/544
See application file for complete search history.

(56) References Cited

U.S. PATENT DOCUMENTS

| 6,425,108 B1* | 7/2002 | Chiang | .................. G11C 29/52 714/764 |
| 11,317,347 B2* | 4/2022 | Jung | ....................... H04W 4/80 |

(Continued)

FOREIGN PATENT DOCUMENTS

| EP | 3327969 A1 | 5/2018 |
| JP | 5691600 B2 | 4/2015 |

OTHER PUBLICATIONS

PCT International Search Report; PCT/US 2021/045201; dated Oct. 28, 2021; 2 pages.

(Continued)

*Primary Examiner* — Andrew Wendell
(74) *Attorney, Agent, or Firm* — Valerie M. Davis; Frank D. Cimino

(57) ABSTRACT

A first BLUETOOTH device includes a transceiver configured to receive a control procedure packet from a second BLUETOOTH device during a BLUETOOTH connection event of a BLUETOOTH connection between the first BLUETOOTH device and the second BLUETOOTH device. The first BLUETOOTH device also includes a controller coupled to the transceiver and configured to set a more data (MD) bit of a response packet to the control procedure packet to a first value independent of whether the first BLUETOOTH device has more data to send to the second BLUETOOTH device. The first value corresponds to maintaining the BLUETOOTH connection event open. The transceiver is further configured to send the response packet to the second BLUETOOTH device during the BLUETOOTH connection event.

20 Claims, 4 Drawing Sheets

(56) References Cited

U.S. PATENT DOCUMENTS

| | | | |
|---|---|---|---|
| 11,457,809 B1* | 10/2022 | Biederman | H04B 5/0031 |
| 2018/0054781 A1* | 2/2018 | Morioka | H04W 72/08 |
| 2019/0028958 A1* | 1/2019 | Broerman | H04W 4/80 |
| 2020/0037229 A1* | 1/2020 | Takahashi | H04W 4/06 |
| 2020/0205210 A1* | 6/2020 | Liu | H04W 76/10 |
| 2021/0059013 A1* | 2/2021 | Boccon-Gibod | H04W 4/20 |

OTHER PUBLICATIONS

Made Harta Dwijaksara et al. A channel access scheme for Bluetooth low energy to support delay-sensitive applications. 2016 IEEE 27th Annual International Symposium on Personal, Indoor, and Mobile Radio Communications (PIMRC). DOI: 10.1109/PIMRC.2016.7794822.

Prithviraj Narendra. Comparison of link layer of BLE and 802.15.4: Running on Contiki OS. Degree Project In Electronic And Computer Systems, Second Level Stockholm, Sweden 2014.

* cited by examiner

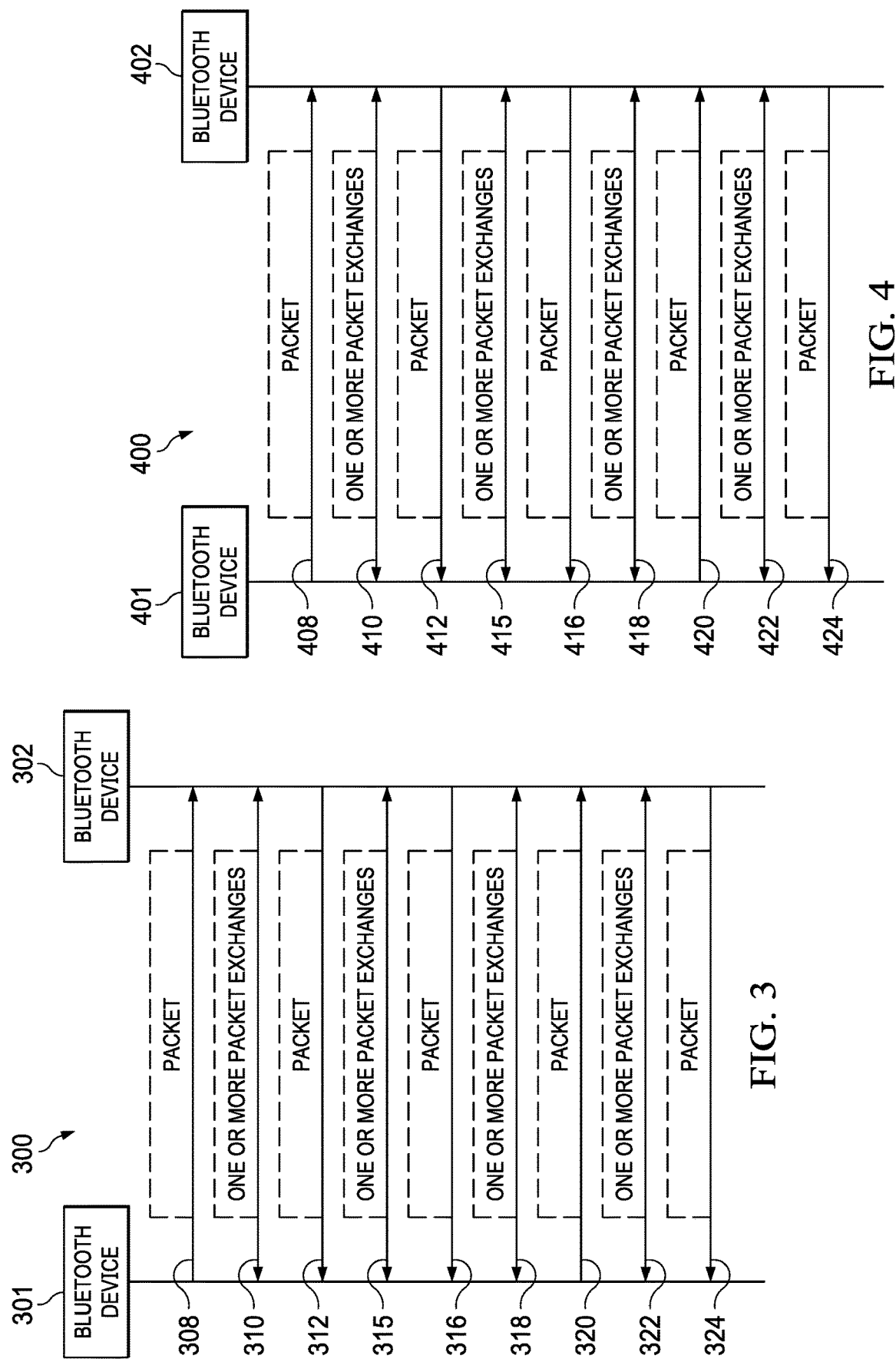

ACCELERATING CONTROL PROCEDURES OVER BLE CONNECTION ORIENTED SERVICES

CROSS-REFERENCE TO RELATED APPLICATIONS

The present application claims priority to U.S. Provisional Patent Application No. 63/067,185, which was filed Aug. 18, 2020, is titled "A Method And Apparatus For Accelerating BLE Control Procedure Connection Oriented Services," and is hereby incorporated herein by reference in its entirety.

SUMMARY

In accordance with at least one example of the disclosure, a first BLUETOOTH device includes a transceiver configured to receive a control procedure packet from a second BLUETOOTH device during a BLUETOOTH connection event of a BLUETOOTH connection between the first BLUETOOTH device and the second BLUETOOTH device. The first BLUETOOTH device also includes a controller coupled to the transceiver and configured to set a more data (MD) bit of a response packet to the control procedure packet to a first value independent of whether the first BLUETOOTH device has more data to send to the second BLUETOOTH device. The first value corresponds to maintaining the BLUETOOTH connection event open. The transceiver is further configured to send the response packet to the second BLUETOOTH device during the BLUETOOTH connection event.

In at least one example, the data field of the response packet is empty.

In at least one example, an MD bit of the control procedure packet is set to a second value indicating that the second BLUETOOTH device does not have more data to send.

In at least one example, the transceiver is further configured to receive a second packet from the second BLUETOOTH device during the BLUETOOTH connection event based on the MD bit of the response packet being set to the first value.

In at least one example, the controller is configured to generate a second packet to be sent to the second BLUETOOTH device during the BLUETOOTH connection event and subsequent to the response packet, and wherein the second packet includes control information responsive to the control procedure packet.

In at least one example, the first BLUETOOTH device further includes a transmission data queue storing data for the first BLUETOOTH device to send to the second BLUETOOTH device, and the controller is configured to set the MD bit of the response packet to the first value when the transmission data queue is empty.

In at least one example, the first value is one.

In accordance with at least one example of the disclosure, a computer program product includes computer readable instructions that, when executed by a processor of a first BLUETOOTH device, cause the first BLUETOOTH device to receive a control procedure packet from a second BLUETOOTH device during a BLUETOOTH connection event of a BLUETOOTH connection between the first BLUETOOTH device and the second BLUETOOTH device. The computer readable instructions further cause the first BLUETOOTH device to set a more data (MD) bit of a response packet to the control procedure packet to a first value independent of whether the first BLUETOOTH device has more data to send to the second BLUETOOTH device. The first value corresponds to maintaining the BLUETOOTH connection event open. The computer readable instructions further cause the first BLUETOOTH device to send the response packet to the second BLUETOOTH device during the BLUETOOTH connection event.

In at least one example, a data field of the response packet is empty.

In at least one example, an MD bit of the control procedure packet is set to a second value indicating that the second BLUETOOTH device does not have more data to send.

In at least one example, the computer readable instructions are further configured to cause the first BLUETOOTH device to receive a second packet from the second BLUETOOTH device during the BLUETOOTH connection event based on the MD bit of the response packet being set to the first value.

In at least one example, the computer readable instructions are further configured to cause the first BLUETOOTH device to generate a second packet to be sent to the second BLUETOOTH device during the BLUETOOTH connection event and subsequent to the response packet. The second packet includes control information responsive to the control procedure packet.

In at least one example, the computer readable instructions are further configured to cause the first BLUETOOTH device to set the MD bit of the response packet to the first value when a transmission data queue of the first BLUETOOTH device is empty.

In at least one example, the first value is a 1.

In accordance with at least one example of the disclosure, method performed by a first BLUETOOTH device includes receiving a control procedure packet from a second BLUETOOTH device during a BLUETOOTH connection event of a BLUETOOTH connection between the first BLUETOOTH device and the second BLUETOOTH device. The method further includes setting a more data (MD) bit of a response packet to the control procedure packet to a first value independent of whether the first BLUETOOTH device has more data to send to the second BLUETOOTH device. The first value corresponds to maintaining the BLUETOOTH connection event open. The method further includes sending the response packet to the second BLUETOOTH device during the BLUETOOTH connection event.

In at least one example, a data field of the response packet is empty.

In at least one example, an MD bit of the control procedure packet is set to a second value indicating that the second BLUETOOTH device does not have more data to send.

In at least one example, the method further includes receiving a second packet from the second BLUETOOTH device during the BLUETOOTH connection event based on the MD bit of the response packet being set to the first value.

In at least one example, the method further includes generating a second packet to be sent to the second BLUETOOTH device during the BLUETOOTH connection event and subsequent to the response packet, and the second packet includes control information responsive to the control procedure packet.

In at least one example, the method further includes setting the MD bit of the response packet to the first value when a transmission data queue of the first BLUETOOTH device is empty.

BRIEF DESCRIPTION OF THE DRAWINGS

For a detailed description of various examples, reference will now be made to the accompanying drawings in which:

FIG. 3 is a timing diagram in accordance with various examples;

FIG. 4 is a timing diagram in accordance with various examples; and

DETAILED DESCRIPTION

In BLUETOOTH low energy (BLE) packets, the more data (MD) bit MD bit (in a MD bit field of a BLE packet header) indicates whether a device has additional data to send. When the MD bits in packets from central and peripheral devices indicate that the devices do not have more data to send, the current connection event between the devices is closed, thereby preventing the transmission of additional packets during the connection event. Currently, without complex and expensive software and/or or hardware, peripheral and central devices cannot respond to a control procedure request from a central device or a peripheral device within the time period (e.g., an interframe spacing specified by a protocol) the peripheral and central devices are required to respond to the packet that includes the control procedure request. Thus, when a peripheral or central device receives a control procedure request and the peripheral or central device does not have more data to send, the peripheral or central device will set the MD bit of a packet the peripheral or central device sends in response to the control procedure request to indicate that the peripheral or central device does not have more data to send. When the peripheral device and the central device do not have additional data to send, this will close the connection event without the peripheral device or the central device substantively responding to the control procedure request. In this scenario, the peripheral device or the central device must wait until the next connection event to substantively respond to the control procedure request, resulting in a delay.

Examples described herein accelerate control procedures (e.g., BLE stack control procedures and/or control procedures at the application level) using the MD bit in a novel way to prevent a connection event from closing regardless of whether the peripheral device as well as the central device has more data to send. In some examples, a device (e.g., the peripheral device or the central device) responding to a control procedure (e.g., a responding device) initiated by another device (e.g., an initiating device) sets the MD bit to indicate that the responding device has more data to send even when the responding device does not have more data (e.g., available and/or backlogged data) to send to the initiating device in order to maintain the connection event so that the responding device can substantively respond to the control procedure request during the connection event in which the control procedure request is sent instead of having to wait until the next connection event to substantively respond to the control procedure request. This substantially reduces completion time of control procedures.

Figure 1:
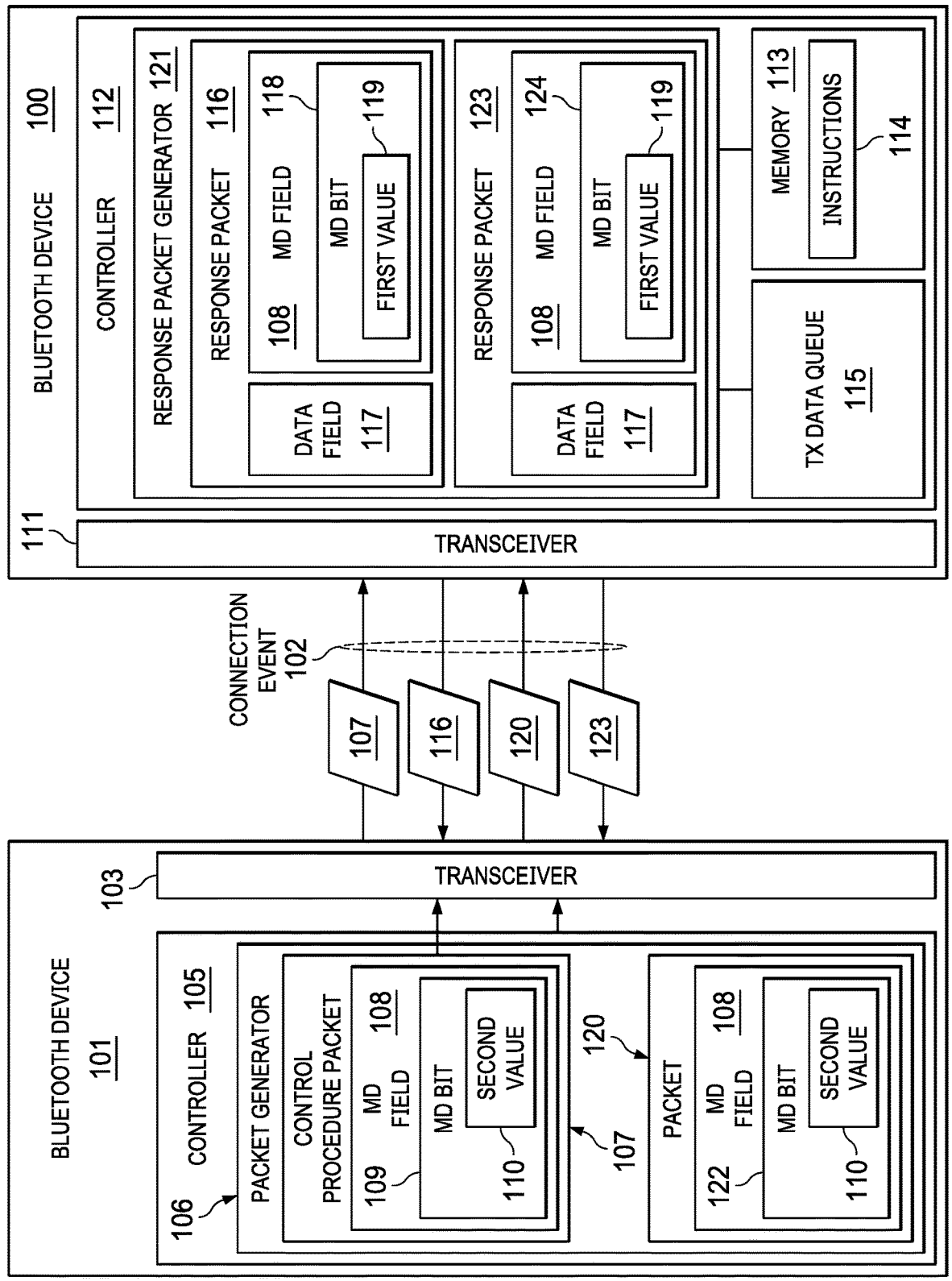
FIG. 1 is a block diagram of a first BLUETOOTH device communicatively coupled to and in communication with a second BLUETOOTH device during a BLUETOOTH connection event in accordance with various examples.

FIG. 1 is a block diagram of an example BLUETOOTH device 100 (e.g., a first BLUETOOTH device) communicatively coupled to and in communication with a BLUETOOTH device 101 (e.g., a second BLUETOOTH device) during a BLUETOOTH connection event 102 (e.g., a single BLUETOOTH connection event) of a BLUETOOTH connection between the BLUETOOTH device 100 and the BLUETOOTH device 101. In some examples, the BLUETOOTH device 100 is a peripheral device, and the BLUETOOTH device 101 is a central device. In other examples, the BLUETOOTH device 100 is a central device, and the BLUETOOTH device 101 is a peripheral device. In some examples, the BLUETOOTH device 100 and the BLUETOOTH device 101 are BLE devices, and the BLUETOOTH connection event 102 is a BLE connection event of a BLE connection between the BLUETOOTH device 101 and the BLUETOOTH device 100.

As used herein, the term BLUETOOTH connection event 102 (e.g., a BLE connection event) refers to a connection period that occurs during a connection interval between a central device and peripheral device. The connection interval begins at a first anchor point at which the central device starts to transmit a Data Physical Channel (PDU) to the peripheral, and ends prior to the succeeding anchor point (the anchor point immediately following the first anchor point) at which the central device starts to transmit a PDU.

The BLUETOOTH device 101 includes a transceiver 103 and a controller 105 coupled to the transceiver 103. The controller 105 includes a packet generator 106 configured to generate, produce, construct, and/or provide one or more packets for sending to the BLUETOOTH device 100 during the BLUETOOTH connection event 102. For example, the one or more packets generated, produced, constructed, and/or provided by the packet generator 106 for sending (e.g., to the BLUETOOTH device 100) may include one or more control procedure packets (such as a control procedure packet 107).

As used herein, the term control procedure packet refers to a packet (e.g., the control procedure packet 107) that includes control information (e.g., an encryption request) corresponding to a control procedure (e.g., an encryption procedure). A control procedure packet (e.g., the control procedure packet 107) includes a locally generated control payload (e.g., a control payload generated by a controller, such as the controller 105) or a payload provided from an upper layer (e.g., a BLE host or a BLE application). In examples in which the control procedure packet (e.g., the control procedure packet 107) includes a payload provided from an upper layer, the controller (e.g., the controller 105) wraps the payload within a link layer data PDU to provide the control procedure packet. In examples in which the control procedure packet (e.g., the control procedure packet 107) includes a payload provided from an upper layer, the control procedure packet is seen as a data packet in link layer.

In some examples, the control procedure corresponding to the control procedure packet 107 is initiated by the BLUETOOTH device 101. In some examples in which the control procedure corresponding to the control procedure packet 107 is initiated by the BLUETOOTH device 101, the control procedure packet 107 is a first packet of the control procedure.

In other examples, the control procedure corresponding to the control procedure packet 107 is initiated by the BLUETOOTH device 100. In these examples, the BLUETOOTH device 100 sends a control procedure packet [not illustrated]

to the BLUETOOTH device 101 prior to the BLUETOOTH device 101 sending the control procedure packet 107.

The control procedure packet 107 includes fields, such as the MD field 108. Although FIG. 1 illustrates only the MD field 108 in the control procedure packet 107, the control procedure packet 107 may include one or more additional fields, such as a data field. In some examples, the BLUETOOTH device 101 does not have data to send to the BLUETOOTH device 100 (e.g., when the control procedure packet 107 is generated). In these examples, the controller 105 is configured to set an MD bit 109 of the MD field 108 of the control procedure packet 107 to a second value 110 based on and/or indicating that the BLUETOOTH device 101 does not have data to send to the BLUETOOTH device 100 (e.g., when the control procedure packet 107 is generated). The second value 110 corresponds to terminating/closing the BLUETOOTH connection event 102. For example, if successive packets of a packet exchange between the BLUETOOTH device 101 and the BLUETOOTH device 100 during the BLUETOOTH connection event 102 included an MD bit set to the second value 110, the BLUETOOTH connection event 102 would terminate/close responsive to the MD bits of the successive packets being set to the second value 110. The BLUETOOTH device 101 is configured to transmit (e.g., to the BLUETOOTH device 100), using the transceiver 103, the control procedure packet 107 during the BLUETOOTH connection event 102. In some examples, the control procedure packet 107 is sent at an anchor point of the BLUETOOTH connection event 102. In other examples, the control procedure packet 107 is sent at a non-anchor point of the BLUETOOTH connection event 102.

The BLUETOOTH device 100 includes a transceiver 111 and a controller 112 coupled to the transceiver 111. In the example illustrated in FIG. 1, the BLUETOOTH device 100 also includes a memory 113 coupled to the controller 112 and storing processor readable instructions 114. In some examples, the controller 112 is configured to execute the processor readable instructions 114 to perform one or more operations described herein. The BLUETOOTH device 100 also includes a transmission data queue 115 coupled to the controller 112 and configured to store data for transmission by the BLUETOOTH device 100.

The transceiver 111 is configured to receive the control procedure packet 107 from the BLUETOOTH device 101 during the BLUETOOTH connection event 102. The controller 112 is configured to generate a response packet 116 responsive to the control procedure packet 107. The response packet 116 includes the MD field 108 and may include one or more other fields, such as a data field 117.

The controller 112 is configured to set an MD bit 118 of the MD field 108 of the response packet 116 to a first value 119 independent of (e.g., regardless of) whether the BLUETOOTH device 100 has data to send to the BLUETOOTH device 101 (e.g., when the response packet 116 is generated). For example, the controller 112 includes a response packet generator 121 that is configured to generate the response packet 116 including the MD bit 118 set to the first value 119 even when the BLUETOOTH device 100 does not have data to send to the BLUETOOTH device 101 when the response packet 116 is generated. The BLUETOOTH device 100 is further configured to send, using the transceiver 111, the response packet 116 to the BLUETOOTH device 101 during the BLUETOOTH connection event 102.

The first value 119 corresponds to maintaining the BLUETOOTH connection event 102 open. In some examples, the first value 119 is a 1, and the second value 110 is a 0.

The BLUETOOTH device 100 setting the MD bit 118 of the response packet 116 independent of whether the BLUETOOTH device 100 has data to send to the BLUETOOTH device 101 when the response packet 116 is generated means that the BLUETOOTH device 100 sets the MD bit 118 of the response packet 116 regardless of whether the BLUETOOTH device 100 has data to send to the BLUETOOTH device 101 when the response packet 116 is generated. For instance, in examples in which the data field 117 is empty, the BLUETOOTH device 100 is configured to set the MD bit 118 to the first value 119 even though the data field 117 of the response packet 116 is empty. Alternatively or additionally, in examples in which the transmission data queue 115 of the BLUETOOTH device 100 is empty (e.g., when the response packet 116 is generated), the BLUETOOTH device 100 is configured to set the MD bit 118 to the first value 119.

In some examples (e.g., first examples), the BLUETOOTH device 100 (e.g., the controller 112) is further configured to set the MD bit 118 of the response packet 116 independent of whether the BLUETOOTH device 100 has data to send to the BLUETOOTH device 101 (e.g., when the response packet 116 is generated) when (e.g., based on or responsive to determining or detecting that): 1) a control procedure between the BLUETOOTH device 100 and the BLUETOOTH device 101 is being initiated (e.g., by the BLUETOOTH device 100) or was previously initiated (e.g., by the BLUETOOTH device 100 or the BLUETOOTH device 101) and has not been completed; and 2) the response packet 116 will not complete the control procedure. In some of the first examples, prior to generating the response packet 116, the controller 112 is configured to determine: 1) whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed; and 2) whether the response packet 116 will complete the control procedure.

In some examples in which the controller 112 is configured to determine whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed, the controller 112 is configured to determine whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed based on a format and/or content of a control procedure packet (e.g., the control procedure packet 107) from the BLUETOOTH device 101 and according to a relevant protocol that defines packets of a control procedure. For example, the controller 112 may at least partially parse the control procedure packet 107 to determine that the control procedure packet 107 is a control procedure packet based on a format and/or content of the control procedure packet 107. The controller 112 may additionally determine that the control procedure packet 107 does not complete the control procedure based on a relevant protocol that defines packets of the control procedure (e.g., the controller 112 may determine that the control procedure packet 107 does not correspond to a last packet of a control procedure defined by a relevant protocol). Thus, the controller 112 may be configured to determine whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed based on a format and/or content of a control procedure packet (e.g., the control procedure packet 107) from the BLUETOOTH device 101 and according to a relevant protocol that defines packets of a control procedure.

In some examples, when the controller 112 determines that a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed, the controller 112 is further configured to determine whether the response packet 116 will substantively complete the control procedure. The controller 112 may be configured to determine whether the response packet 116 will substantively complete the control procedure based on whether the response packet 116 substantively responds to the control procedure packet 107 and/or whether a relevant protocol indicates that completion of the control procedure involves subsequent packets (e.g., packets subsequent to the response packet 116). For example, the response packet 116 may not substantively respond to the control procedure indicated in the control procedure packet 107. For example, the BLUETOOTH device 100 may not have sufficient time to fully process (e.g., parse) the control procedure packet 107 and/or to generate a substantive response to the control procedure (e.g., to the control procedure packet 107) within a time period set (e.g., required according to interframe spacing specified by a protocol) for the BLUETOOTH device 100 to respond to the control procedure packet 107. Thus, in this example, the control procedure indicated by the control procedure packet 107 will not be completed responsive to the BLUETOOTH device 101 receiving and processing the response packet 116. In this example, the controller 112 may be configured to determine that the response packet 116 will not complete the control procedure based on the response packet 116 not including a substantive response to the control procedure packet 107. Alternatively or additionally, in another example, a relevant protocol may define the control procedure to include subsequent packets (e.g., packets subsequent to the response packet 116). In this example, the controller 112 may be configured to determine that the response packet 116 will not complete the control procedure based on the relevant protocol.

Thus, in at least some of the first examples, the controller 112 is further configured to set the MD bit 118 of the response packet 116 independent of whether the BLUETOOTH device 100 has data to send to the BLUETOOTH device 101 (e.g., when the response packet 116 is generated) based on or responsive to determining or detecting that: 1) a control procedure between the BLUETOOTH device 100 and the BLUETOOTH device 101 was previously initiated (e.g., by the BLUETOOTH device 100 or the BLUETOOTH device 101) and has not been completed; and 2) the response packet 116 will not complete the control procedure.

In some other examples (e.g., second examples), the BLUETOOTH device 100 (e.g., the controller 112) is further configured to set the MD bit 118 of the response packet 116 independent of whether the BLUETOOTH device 100 has data to send to the BLUETOOTH device 101 (e.g., when the response packet 116 is generated) when (e.g., based on or responsive to determining or detecting that): 1) a control procedure between the BLUETOOTH device 100 and the BLUETOOTH device 101 is being initiated (e.g., by the BLUETOOTH device 100) or was previously initiated (e.g., by the BLUETOOTH device 100 or the BLUETOOTH device 101) and has not been completed; 2) the response packet 116 will not complete the control procedure; and 3) the BLUETOOTH device 100 owes the BLUETOOTH device 101 a control procedure packet corresponding to the control procedure as defined by a relevant protocol. In some of the second examples, prior to generating the response packet 116, the controller 112 is configured to determine: 1) whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed; 2) whether the response packet 116 will complete the control procedure; and 3) whether the BLUETOOTH device 100 owes the BLUETOOTH device 101 a control procedure packet corresponding to the control procedure as defined by a relevant protocol.

In some examples in which the controller 112 is configured to determine whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed, the controller 112 is configured to determine whether a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed as described above. In some examples, when the controller 112 determines that a control procedure between the BLUETOOTH device 100 and the BLUETOOTH device 101 is being initiated (e.g., by the BLUETOOTH device 100) and/or was previously initiated (e.g., by the BLUETOOTH device 100 or the BLUETOOTH device 101) and has not been completed, the controller 112 is further configured to determine whether the response packet 116 will substantively complete the control procedure as described above. In some examples, when the controller 112 determines that the response packet 116 will not substantively complete the control procedure, the controller 112 is further configured to determine whether the BLUETOOTH device 100 owes the BLUETOOTH device 101 a control procedure packet corresponding to the control procedure based on a relevant protocol. For example, the relevant protocol may indicate that the BLUETOOTH device 100 owes the BLUETOOTH device 101 a control procedure packet corresponding to the control procedure in order to complete the control procedure.

Thus, in at least some of the second examples, the controller 112 is further configured to set the MD bit 118 of the response packet 116 independent of whether the BLUETOOTH device 100 has data to send to the BLUETOOTH device 101 (e.g., when the response packet 116 is generated) based on or responsive to determining or detecting that: 1) a control procedure between the BLUETOOTH device 100 and the BLUETOOTH device 101 was previously initiated (e.g., by the BLUETOOTH device 100 or the BLUETOOTH device 101) and has not been completed; 2) the response packet 116 will not complete the control procedure; and 3) the BLUETOOTH device 100 owes the BLUETOOTH device 101 a control procedure packet corresponding to the control procedure as defined by a relevant protocol. The BLUETOOTH device 101 is configured to receive the response packet 116 during the BLUETOOTH connection event 102. Responsive to receiving the response packet 116 with the MD bit 118 set to the first value 119, the BLUETOOTH device 101 (e.g., the controller 105) is configured to generate a second packet 120 for sending to the BLUETOOTH device 100 during the BLUETOOTH connection event 102. In some examples, the second packet 120 is empty (e.g., neither includes control information nor data). In these examples, the controller 105 is configured to set an MD bit 122 to the second value 110 based on the BLUETOOTH device 101 not having data to send to the BLUETOOTH device 100 (e.g., when the second packet 120 is generated).

In some examples, the BLUETOOTH device 101 may be configured not to generate and send the second packet 120 if the response packet 116 had included the MD bit 118 set to the second value 110. For example, the BLUETOOTH device 101 may not have additional data to send to the BLUETOOTH device 100. In these examples, the BLUETOOTH connection event 102 would have terminated responsive to the BLUETOOTH device 101 receiving the response packet 116 with the MD bit 118 set to the second value 110. Thus, in some examples (e.g., when the BLUETOOTH device 100 and the BLUETOOTH device 101 do not have more data to send), by setting the MD bit 118 of the response packet 116 to the first value 119 independent of whether the BLUETOOTH device 100 has more data to send, the BLUETOOTH device 100 may maintain the BLUETOOTH connection event 102 open, (resulting in the BLUETOOTH device 101 generating and sending the second packet 120), thereby providing the BLUETOOTH device 100 the opportunity to substantively respond to the control procedure (indicated in the control procedure packet 107) during the BLUETOOTH connection event 102 and subsequent to sending the response packet 116.

The BLUETOOTH device 101 is configured to send, using the transceiver 103, the second packet 120 to the BLUETOOTH device 100 during the BLUETOOTH connection event 102. The BLUETOOTH device 100 is configured to receive the second packet 120 using the transceiver 111 during the BLUETOOTH connection event 102. In some examples, subsequent to the BLUETOOTH device 100 receiving the second packet 120, the controller 112 is configured to generate a second response packet 123 to be sent to the BLUETOOTH device 101 during the BLUETOOTH connection event 102. In some examples, the second response packet 123 includes control information responsive to the control procedure indicated in the control procedure packet 107. To illustrate using the example in which the control procedure packet 107 included the LL_ENC_REQ, the control information in the second response packet 123 may include an LL_ENC_RSP (e.g., an encryption response to the encryption request). In some examples, an MD bit 124 of the second response packet 123 is set to the first value 119 independent of whether the BLUETOOTH device 100 has data to send to the BLUETOOTH device 101 (e.g., when the second response packet 123 is generated) as described above with reference to the MD bit 118.

In some examples, the second response packet 123 is generated and sent by the BLUETOOTH device 100 responsive to the BLUETOOTH device 100 receiving the second packet 120.

In other examples, the second response packet 123 is generated and sent by the BLUETOOTH device 100 responsive to the BLUETOOTH device 100 receiving a different packet [not illustrated] (e.g., an "intermediate" response packet) sent by the BLUETOOTH device 101 during the BLUETOOTH connection event 102. For example, the BLUETOOTH device 100 may generate and send a first intermediate response packet [not illustrated] to the BLUETOOTH device 101 responsive to the BLUETOOTH device 100 receiving the second packet 120. The first intermediate response packet may include an MD bit set to the first value 119 and the first intermediate response packet may be empty (e.g., not include data or control information). The BLUETOOTH device 101 may receive the first intermediate response packet and may generate and send a second intermediate response packet responsive to receiving the first intermediate response packet. The second intermediate response packet may include the MD bit set to the second value 110, and the second intermediate response packet may be empty (e.g., not include data or control information). The BLUETOOTH devices 101 and 100 may exchange intermediate response packets (e.g., empty packets) with MD bits set as described with reference to the first and second intermediate response packets until the BLUETOOTH device 100 generates and sends the second response packet 123, which may include control information responsive to the control procedure indicated in the control procedure packet 107.

Thus, by setting the MD bits (e.g., 118, 124) in the MD field 108 of response packets (e.g., 116, 123) to the first value 119 when the BLUETOOTH device 100 does not have more data, the BLUETOOTH device 100 maintains the BLUETOOTH connection event 102 open, thereby enabling the BLUETOOTH devices 101 and the BLUETOOTH device 100 to exchange more packets during the BLUETOOTH connection event 102, enabling (in some examples) completion of a control procedure (e.g., an encryption control procedure) during a single BLUETOOTH connection event when otherwise multiple BLUETOOTH connection events would have been used to complete the control procedure.

Figure 2:
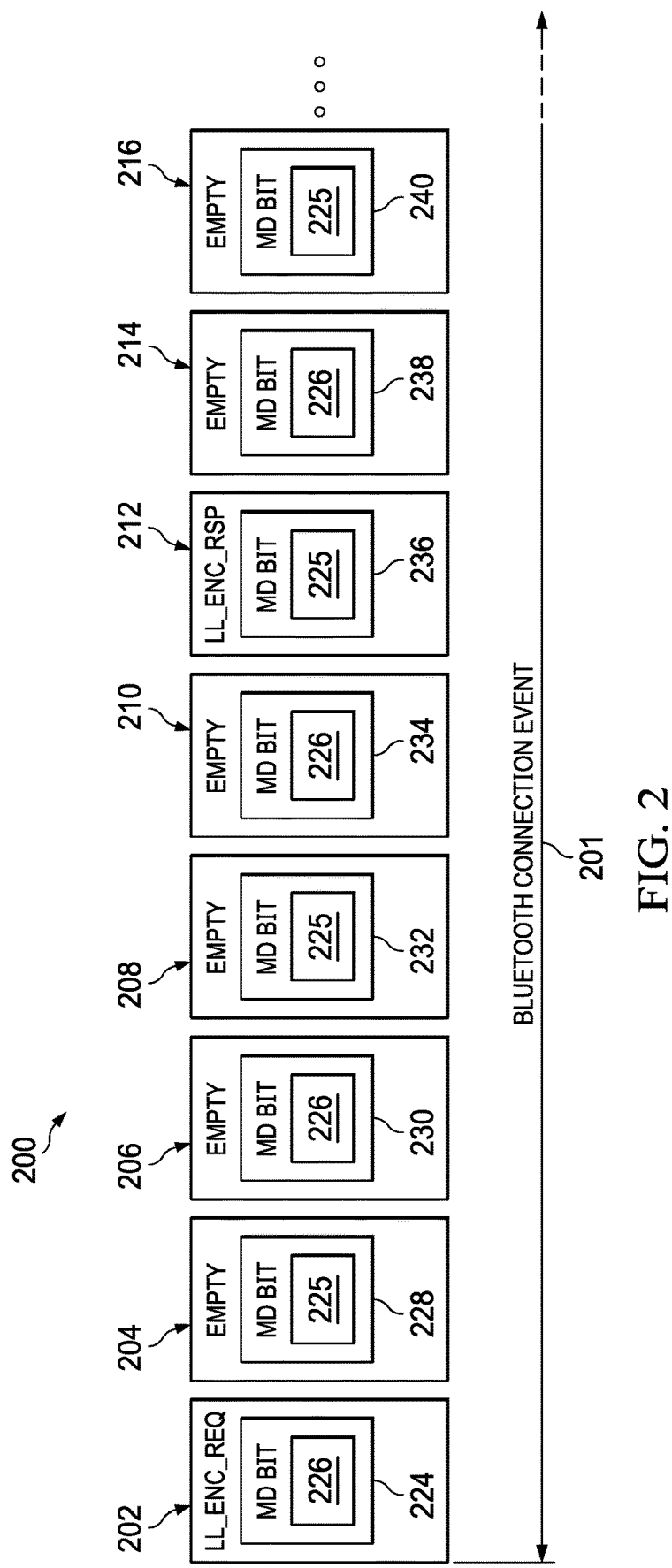
FIG. 2 is a diagram of a packet stream in accordance with various examples.

FIG. 2 illustrates an example of a packet stream 200 of packets communicated between the BLUETOOTH device 100 and BLUETOOTH device 101 of FIG. 1 during a BLUETOOTH connection event 201 (e.g., a single BLUETOOTH connection event). The BLUETOOTH connection event 201 may correspond to the BLUETOOTH connection event 102 of FIG. 1. A time interval between the packets may correspond to a T IFS spacing.

The packets include a control procedure packet 202 generated and sent by the BLUETOOTH device 101 of FIG. 1 to the BLUETOOTH device 100 of FIG. 1 at an anchor point of the connection event. The control procedure packet 202 includes an LL_Enc_Req (e.g., an encryption request). The control procedure packet 202 of FIG. 2 may correspond to the control procedure packet 107 of FIG. 1. The MD bit 224 of the control procedure packet 202 is set to a second value 226 (e.g., "0") because, in the example illustrated in FIG. 2, the BLUETOOTH device 101 of FIG. 1 does not have additional data to send. In some examples, the second value 226 corresponds to the second value 110 of FIG. 1. In some examples, a duration of sending the control procedure packet 202 is 264 microseconds.

The packets further include a response packet 204 generated and sent by the BLUETOOTH device 100 of FIG. 1 to the BLUETOOTH device 101 of FIG. 1 responsive to the BLUETOOTH device 100 of FIG. 1 receiving the control procedure packet 202 of FIG. 2. The response packet 204 of FIG. 2 may correspond to the response packet 116 of FIG. 1. In some examples, a duration of sending the response packet 204 is 80 microseconds. The MD bit 228 of the response packet 204 of FIG. 2 is set to a first value 225 corresponding to a "1". The first value 225 of FIG. 2 may correspond to the first value 119 of FIG. 1. The response packet 204 of FIG. 2 is empty (e.g., neither includes data nor control information). Thus, in this example, the response packet 204 is generated to include an MD bit 228 that corresponds to the first value 225 even though the response packet 204 is empty. This results in maintaining the BLUETOOTH connection event 201 open.

The packets further include a packet 206 generated and sent by the BLUETOOTH device 101 of FIG. 1 to the BLUETOOTH device 100 of FIG. 1. In some examples, a duration of sending the packet 206 is 80 microseconds. The packet 206 is empty (e.g., neither includes data nor control information) and the MD bit 230 of the packet 206 is set to the second value 226 (e.g., "0"). The packet 206 may correspond to the second packet 120 of FIG. 1.

The packets further include a response packet 208 generated and sent by the BLUETOOTH device 100 of FIG. 1 to the BLUETOOTH device 101 of FIG. 1. In some examples, a duration of sending the response packet 208 is 80 microseconds. The response packet 208 is empty (e.g., neither includes data nor control information) and the MD bit 232 of the response packet 208 is set to the first value 225 even though the response packet 208 is empty. The response packet 208 may correspond to the first intermediate response packet described above with reference to FIG. 1.

The packets further include a response packet 210 generated and sent by the BLUETOOTH device 101 of FIG. 1 to the BLUETOOTH device 100 of FIG. 1. In some examples, a duration of sending the response packet 210 is 80 microseconds. The response packet 210 is empty (e.g., neither includes data nor control information) and the MD bit 234 of the response packet 210 is set to the second value 226 (e.g., "0"). The response packet 210 may correspond to the second intermediate response packet described above with reference to FIG. 1.

The packets further include a response packet 212 generated and sent by the BLUETOOTH device 100 of FIG. 1 to the BLUETOOTH device 101 of FIG. 1. In some examples, a duration of sending the response packet 212 is 80 microseconds. The response packet 212 includes an LL_Enc_Rsp (an encryption response) responsive to the LL_Enc_Req of the control procedure packet 202, and the MD bit 236 of the response packet 212 is set to the first value 225 even though the transmission data queue 115 of the BLUETOOTH device 100 of FIG. 1 is empty. The response packet 212 may correspond to the second response packet 123 of FIG. 1.

The packets further include a packet 214 generated and sent by the BLUETOOTH device 101 of FIG. 1 to the BLUETOOTH device 100 of FIG. 1. In some examples, a duration of sending the packet 214 is 80 microseconds. The packet 214 is empty (e.g., neither includes data nor control information) and the MD bit 238 of the packet 214 is set to the second value 226 (e.g., "0").

The packets further include a packet 216 generated and sent by the BLUETOOTH device 100 of FIG. 1 to the BLUETOOTH device 101 of FIG. 1. In some examples, a duration of sending the packet 216 is 80 microseconds. The packet 216 is empty (e.g., neither includes data nor control information) and the MD bit 240 of the packet 216 is set to the first value 225 even though the packet 216 is empty.

Thus, as can be seen in the example packet stream 200 of FIG. 2, the BLUETOOTH device 100 of FIG. 1 maintains the BLUETOOTH connection event 102 open by setting the MD bits 228 and 232 of the response packets 204 and 208 to the first value 225, thereby enabling the BLUETOOTH device 100 of FIG. 1 to respond to the control procedure packet 202 with the response packet 212 to provide a control information response within the BLUETOOTH connection event 102 when, if the MD bit 228 of the response packet 204 were set to the second value 226, the connection event would have closed, preventing the BLUETOOTH device 100 from substantively responding to the encryption request in the control procedure packet 202.

FIG. 3 illustrates an example of a timing diagram 300 of at least some packets sent between BLUETOOTH devices 301 and 302 during a BLUETOOTH connection event (e.g., a single BLUETOOTH connection event). The packets of the timing diagram 300 include one or more control procedure packets corresponding to a control procedure between the BLUETOOTH devices 301 and 302. In some examples, the BLUETOOTH devices 301 and 302 of FIG. 3 correspond to the BLUETOOTH devices 101 and 100 of FIG. 1, respectively. Additionally, the BLUETOOTH connection event corresponding to FIG. 3 (e.g., the BLUETOOTH connection event during which the packets of FIG. 3 are sent and/or received between the BLUETOOTH devices 301 and 302) may correspond to the BLUETOOTH connection event 102 of FIG. 1.

In the example illustrated in FIG. 3, the BLUETOOTH device 302 is configured to set an MD bit of each packet of the packets of the timing diagram 300, except a last packet of the packets of the timing diagram 300, that the BLUETOOTH device 302 is configured to send (during performance of the control procedure) to the BLUETOOTH device 301 to a first value (e.g., the first value 119 of FIG. 1) independent of whether the BLUETOOTH device 302 has data to send (e.g., when the packet is generated).

The timing diagram 300 includes a packet 308 (e.g., a control procedure packet) sent by the BLUETOOTH device 301 to the BLUETOOTH device 302. The packet 308 includes control information (e.g., an encryption request), and may correspond to the control procedure packet 107 of FIG. 1. In some examples, the MD bit of the packet 308 is set to a second value (e.g., the second value 110 of FIG. 1) based on the BLUETOOTH device 301 not having data to send to the BLUETOOTH device 302 when the BLUETOOTH device 301 generates the packet 308.

The timing diagram 300 includes one or more packet exchanges 310 of packets alternatively sent between the BLUETOOTH device 301 and the BLUETOOTH device 302. Each packet (of the one or more packet exchanges 310) that is sent by the BLUETOOTH device 302 has an MD bit set to the first value independent of (e.g., regardless of) whether the BLUETOOTH device 302 has data to send to the BLUETOOTH device 301 when the BLUETOOTH device 302 generates the packet. In an example, the BLUETOOTH device 302 does not have data to send to the BLUETOOTH device 301 during the one or more packet exchanges 310. In this example, the BLUETOOTH device 302 sets the MD bit of each packet (of the one or more packet exchanges 310) that is sent from the BLUETOOTH device 302 to the BLUETOOTH device 301 to the first value despite the BLUETOOTH device 302 not having data to send to the BLUETOOTH device 301 during the one or more packet exchanges 310.

Alternatively or additionally, in some examples, at least one packet (of the one or more packet exchanges 310) that is sent by the BLUETOOTH device 301 has an MD bit set to the second value because the BLUETOOTH device 301 does not have data to send to the BLUETOOTH device 302 when the at least one packet is generated.

In examples in which the MD bit of the packet 308 and/or the MD bit of one or more of the packets (of the one or more packet exchanges 310) that is sent by the BLUETOOTH device 301 is set to the second value, the BLUETOOTH device 302 setting the MD bit of each packet (of the one or more packet exchanges 310) that is sent by the BLUETOOTH device 302 to the first value (e.g., even when the BLUETOOTH device 302 does not have data to send to the BLUETOOTH device 301 when the packet is generated) prevents the BLUETOOTH connection event from terminating/closing.

The timing diagram 300 includes a response packet 312 (e.g., a control procedure packet) sent by the BLUETOOTH device 302 to the BLUETOOTH device 301 in response to a last packet of the one or more packet exchanges 310. The response packet 312 includes control information (e.g., an encryption response) responsive to the packet 308. In some examples, the response packet 312 corresponds to the second response packet 123 of FIG. 1 or to the response packet 212 of FIG. 2. The BLUETOOTH device 302 sets the MD bit of the response packet 312 to the first value independent of whether the BLUETOOTH device 302 has data to send to the BLUETOOTH device 301 when the response packet 312 is generated. To illustrate, in some examples, the BLUETOOTH device 302 does not have data to send to the BLUETOOTH device 301 (e.g., when the response packet 312 is generated), yet the BLUETOOTH device 302 sets the MD bit of the response packet 312 to the first value.

In examples in which the MD bit of the last packet of the one or more packet exchanges 310 that is sent by the BLUETOOTH device 301 is set to the second value, the BLUETOOTH device 302 setting the MD bit of the response packet 312 to the first value (e.g., even when the BLUETOOTH device 302 does not have data to send to the BLUETOOTH device 301 when the packet is generated) prevents the BLUETOOTH connection event from terminating/closing.

The timing diagram 300 includes one or more packet exchanges 315 of packets alternatively sent between the BLUETOOTH device 301 and the BLUETOOTH device 302. Each packet (of the one or more packet exchanges 315) that is sent by the BLUETOOTH device 302 has an MD bit set to the first value independent of whether the BLUETOOTH device 302 has data to send to the BLUETOOTH device 301 when the BLUETOOTH device 302 generates the packet. In an example, the BLUETOOTH device 302 does not have data to send to the BLUETOOTH device 301 during the one or more packet exchanges 315, yet the BLUETOOTH device 302 sets the MD bit of each packet (of the one or more packet exchanges 315) that is sent by the BLUETOOTH device 302 to the BLUETOOTH device 301 to the first value.

Alternatively or additionally, at least one packet (of the one or more packet exchanges 315) that is sent by the BLUETOOTH device 301 has an MD bit set to the second value because the BLUETOOTH device 301 does not have data to send to the BLUETOOTH device 302 when the at least one packet is generated.

In examples in which the MD bit of one or more of the packets (of the one or more packet exchanges 315) that is sent by the BLUETOOTH device 301 is set to the second value, the BLUETOOTH device 302 setting the MD bit of each packet (of the one or more packet exchanges 315) that is sent by the BLUETOOTH device 302 to the first value (e.g., even when the BLUETOOTH device 302 does not have data to send to the BLUETOOTH device 301 when the packet is generated) prevents the BLUETOOTH connection event from terminating/closing.

The timing diagram 300 includes a packet 316 (e.g., a control procedure packet) sent by the BLUETOOTH device 302 to the BLUETOOTH device 301 in response to a last packet of the one or more packet exchanges 315. The packet 316 includes control information. For example, the packet 316 may include an LL_START_ENC_REQ (e.g., a start encryption request). The BLUETOOTH device 302 sets the MD bit of the packet 316 to the first value independent of whether the BLUETOOTH device 302 has data to send to the BLUETOOTH device 301 when the packet 316 is generated. To illustrate, in some examples, the BLUETOOTH device 302 does not have data to send to the BLUETOOTH device 301 (e.g., when the packet 316 is generated), yet the BLUETOOTH device 302 sets the MD bit of the packet 316 to the first value.

In examples in which the MD bit of the last packet (of the one or more packet exchanges 315) that is sent by the BLUETOOTH device 301 is set to the second value, the BLUETOOTH device 302 setting the MD bit of the packet 316 to the first value (e.g., even when the BLUETOOTH device 302 does not have data to send to the BLUETOOTH device 301 when the packet 316 is generated) prevents the BLUETOOTH connection event from terminating/closing.

The timing diagram 300 includes one or more packet exchanges 318 of packets alternatively sent between the BLUETOOTH device 301 and the BLUETOOTH device 302. Each packet (of the one or more packet exchanges 318) that is sent by the BLUETOOTH device 302 has an MD bit set to the first value independent of whether the BLUETOOTH device 302 has data to send to the BLUETOOTH device 301 when the BLUETOOTH device 302 generates the packet. In an example, the BLUETOOTH device 302 does not have data to send to the BLUETOOTH device 301 during the one or more packet exchanges 318, yet the BLUETOOTH device 302 sets the MD bit of each packet (of the one or more packet exchanges 318) that is sent by the BLUETOOTH device 302 to the BLUETOOTH device 301 to the first value.

Alternatively or additionally, at least one packet (of the one or more packet exchanges 318) that is sent by the BLUETOOTH device 301 has an MD bit set to the second value because the BLUETOOTH device 301 does not have data to send to the BLUETOOTH device 302 when the at least one packet is generated.

In examples in which the MD bit of one or more of the packets (of the one or more packet exchanges 318) that is sent by the BLUETOOTH device 301 is set to the second value, the BLUETOOTH device 302 setting the MD bit of each packet (of the one or more packet exchanges 318) that is sent by the BLUETOOTH device 302 to the first value (e.g., even when the BLUETOOTH device 302 does not have data to send to the BLUETOOTH device 301 when the packet is generated) prevents the BLUETOOTH connection event from terminating/closing.

The timing diagram 300 includes a packet 320 (e.g., a control procedure packet) sent by the BLUETOOTH device 301 to the BLUETOOTH device 302 in response to a last packet of the one or more packet exchanges 318. The packet 320 includes control information. For example, the packet 320 may include an LL_START_ENC_RSP (e.g., a start encryption response). The BLUETOOTH device 302 sets the MD bit of the packet 320 to the first value independent of whether the BLUETOOTH device 302 has data to send to the BLUETOOTH device 301 when the packet 320 is generated. To illustrate, in some examples, the BLU- ETOOTH device 302 does not have data to send to the BLUETOOTH device 301 (e.g., when the packet 320 is generated), yet the BLUETOOTH device 302 sets the MD bit of the packet 320 to the first value.

In examples in which the MD bit of the last packet (of the one or more packet exchanges 318) that is sent by the BLUETOOTH device 301 is set to the second value, the BLUETOOTH device 302 setting the MD bit of the packet 320 to the first value (e.g., even when the BLUETOOTH device 302 does not have data to send to the BLUETOOTH device 301 when the packet 320 is generated) prevents the BLUETOOTH connection event from terminating/closing.

The timing diagram 300 includes one or more packet exchanges 322 of packets alternatively sent between the BLUETOOTH device 301 and the BLUETOOTH device 302. Each packet (of the one or more packet exchanges 322) that is sent by the BLUETOOTH device 302 to the BLUETOOTH device 301 has an MD bit set to the first value independent of whether the BLUETOOTH device 302 has data to send to the BLUETOOTH device 301 when the BLUETOOTH device 302 generates the packet. In an example, the BLUETOOTH device 302 does not have data to send to the BLUETOOTH device 301 during the one or more packet exchanges 322, yet the BLUETOOTH device 302 sets the MD bit of each packet (of the one or more packet exchanges 322) that is sent by the BLUETOOTH device 302 to the BLUETOOTH device 301 to the first value.

Alternatively or additionally, at least one packet (of the one or more packet exchanges 322) that is sent by the BLUETOOTH device 301 has an MD bit set to the second value because the BLUETOOTH device 301 does not have data to send to the BLUETOOTH device 302 when the at least one packet is generated.

In examples in which the MD bit of one or more of the packets (of the one or more packet exchanges 322) that is sent by the BLUETOOTH device 301 is set to the second value, the BLUETOOTH device 302 setting the MD bit of each packet (of the one or more packet exchanges 322) that is sent by the BLUETOOTH device 302 to the first value (e.g., even when the BLUETOOTH device 302 does not have data to send to the BLUETOOTH device 301 when the packet is generated) prevents the BLUETOOTH connection event from terminating/closing.

The timing diagram 300 includes a packet 324 sent by the BLUETOOTH device 302 to the BLUETOOTH device 301 in response to a last packet of the one or more packet exchanges 322. The packet 324 includes control information that completes the 5-way encryption control procedure. For example, the packet 324 may include an LL_START_ENC_RSP (e.g., a start encryption response).

Because the packet 324 is a last packet the BLUETOOTH device 302 is configured to send to the BLUETOOTH device 301 during the control procedure (e.g., as defined by a relevant protocol), the BLUETOOTH device 302 sets the MD bit of the packet 324 to a value based on whether the BLUETOOTH device 302 has data to send to the BLUETOOTH device 301 when the packet 324 is generated. In an example, the BLUETOOTH device 302 does not have data to send to the BLUETOOTH device 301 when the packet 324 is generated. In this example, the BLUETOOTH device 302 sets the MD bit of the packet 324 to the second value.

In examples in which the MD bit of the last packet (of the one or more packet exchanges 322) that is sent by the BLUETOOTH device 301 is set to the second value and the MD bit of the packet 324 is set to the second value, the BLUETOOTH connection event will end.

FIG. 4 illustrates an example of a timing diagram 400 of at least some packets sent between BLUETOOTH devices 401 and 402 during a BLUETOOTH connection event (e.g., a single BLUETOOTH connection event). The packets of the timing diagram 400 include one or more control procedure packets corresponding to a control procedure between the BLUETOOTH devices 401 and 402. In some examples, the BLUETOOTH devices 401 and 402 of FIG. 4 correspond to the BLUETOOTH devices 101 and 100 of FIG. 1, respectively. Additionally, the BLUETOOTH connection event corresponding to FIG. 4 (e.g., the BLUETOOTH connection event during which the packets of FIG. 4 are sent and/or received between the BLUETOOTH devices 401 and 402) may correspond to the BLUETOOTH connection event 102 of FIG. 1.

In the example illustrated in FIG. 4, the BLUETOOTH device 402 is configured to set an MD bit of each packet of the packets of the timing diagram 400, except a last packet of the packets of the timing diagram 400, that the BLUETOOTH device 402 is configured to send (during performance of the control procedure) to the BLUETOOTH device 401 to a first value (e.g., the first value 119 of FIG. 1) independent of whether the BLUETOOTH device 402 has data to send (e.g., when the packet is generated) when the BLUETOOTH device 402 owes the BLUETOOTH device 401 a control procedure packet (e.g., when the BLUETOOTH device 402 is configured to send a next control procedure packet to the BLUETOOTH device 401). Additionally, in the example illustrated in FIG. 4, the BLUETOOTH device 401 is configured to set an MD bit of each packet of the packets of the timing diagram 400 that the BLUETOOTH device 401 is configured to send (during performance of the control procedure) to the BLUETOOTH device 402 to the first value independent of whether the BLUETOOTH device 401 has data to send (e.g., when the packet is generated) when the BLUETOOTH device 401 owes the BLUETOOTH device 402 a control procedure packet (e.g., when the BLUETOOTH device 401 is configured to send a next control procedure packet to the BLUETOOTH device 402).

The timing diagram 400 includes a packet 408 (e.g., a control procedure packet) sent by the BLUETOOTH device 401 to the BLUETOOTH device 402. The packet 408 includes control information (e.g., an encryption request), and may correspond to the control procedure packet 107 of FIG. 1. In some examples, the MD bit of the packet 408 is set to a second value (e.g., the second value 110 of FIG. 1) based on the BLUETOOTH device 401 not having data to send to the BLUETOOTH device 402 when the BLUETOOTH device 401 generates the packet 408.

The BLUETOOTH devices 401 and 402 are configured to operate according to a relevant protocol that indicates that a next control procedure packet (of the control procedure) after the packet 408 is to be sent by the BLUETOOTH device 402. In other words, the BLUETOOTH device 402 owes the BLUETOOTH device 401 a control procedure packet responsive to the packet 408.

The timing diagram 400 includes one or more packet exchanges 410 of packets alternatively sent between the BLUETOOTH device 401 and the BLUETOOTH device 402. Because the BLUETOOTH device 402 owes the BLUETOOTH device 402 a control procedure packet responsive to the packet 408, each packet (of the one or more packet exchanges 410) that is sent by the BLUETOOTH device 402 has an MD bit set to the first value independent of (e.g., regardless of) whether the BLUETOOTH device 402 has data to send to the BLUETOOTH device 401 when the BLUETOOTH device 402 generates the packet. In an example, the BLUETOOTH device 402 does not have data to send to the BLUETOOTH device 401 during the one or more packet exchanges 410. In this example, the BLUETOOTH device 402 sets the MD bit of each packet (of the one or more packet exchanges 410) that is sent from the BLUETOOTH device 402 to the BLUETOOTH device 401 to the first value despite the BLUETOOTH device 402 not having data to send to the BLUETOOTH device 401 during the one or more packet exchanges 410.

Alternatively or additionally, in some examples, at least one packet (of the one or more packet exchanges 410) that is sent by the BLUETOOTH device 401 has an MD bit set to the second value because the BLUETOOTH device 401 does not have data to send to the BLUETOOTH device 402 when the at least one packet is generated.

In examples in which the MD bit of the packet 408 and/or the MD bit of one or more of the packets (of the one or more packet exchanges 410) that is sent by the BLUETOOTH device 401 is set to the second value, the BLUETOOTH device 402 setting the MD bit of each packet (of the one or more packet exchanges 410) that is sent by the BLUETOOTH device 402 to the first value (e.g., even when the BLUETOOTH device 402 does not have data to send to the BLUETOOTH device 401 when the packet is generated) prevents the BLUETOOTH connection event from terminating/closing.

The timing diagram 400 includes a response packet 412 (e.g., a control procedure packet) sent by the BLUETOOTH device 402 to the BLUETOOTH device 401 in response to a last packet of the one or more packet exchanges 410. The response packet 412 includes control information (e.g., an encryption response) responsive to the packet 408. In some examples, the response packet 412 corresponds to the second response packet 123 of FIG. 1 or to the response packet 212 of FIG. 2. Because the BLUETOOTH device 402 owes the BLUETOOTH device 401 a control procedure packet responsive to the packet 408, the BLUETOOTH device 402 sets the MD bit of the response packet 412 to the first value independent of whether the BLUETOOTH device 402 has data to send to the BLUETOOTH device 401 when the response packet 412 is generated. To illustrate, in some examples, the BLUETOOTH device 402 does not have data to send to the BLUETOOTH device 401 (e.g., when the response packet 412 is generated), yet the BLUETOOTH device 402 sets the MD bit of the response packet 412 to the first value.

In examples in which the MD bit of the last packet of the one or more packet exchanges 410 that is sent by the BLUETOOTH device 401 is set to the second value, the BLUETOOTH device 402 setting the MD bit of the response packet 412 to the first value (e.g., even when the BLUETOOTH device 402 does not have data to send to the BLUETOOTH device 401 when the response packet 412 is generated) prevents the BLUETOOTH connection event from terminating/closing.

The BLUETOOTH devices 401 and 402 are configured to operate according to a relevant protocol that indicates that a next control procedure packet (of the control procedure) after the response packet 412 is to be sent by the BLUETOOTH device 402. In other words, the BLUETOOTH device 402 owes the BLUETOOTH device 401 a control procedure packet after the response packet 412.

The timing diagram 400 includes one or more packet exchanges 415 of packets alternatively sent between the BLUETOOTH device 401 and the BLUETOOTH device 402. Because the BLUETOOTH device 402 owes the BLUETOOTH device 401 a control procedure packet responsive to the packet 408, each packet (of the one or more packet exchanges 415) that is sent by the BLUETOOTH device 402 has an MD bit set to the first value independent of whether the BLUETOOTH device 402 has data to send to the BLUETOOTH device 401 when the BLUETOOTH device 402 generates the packet. In an example, the BLUETOOTH device 402 does not have data to send to the BLUETOOTH device 401 during the one or more packet exchanges 415, yet the BLUETOOTH device 402 sets the MD bit of each packet (of the one or more packet exchanges 415) that is sent by the BLUETOOTH device 402 to the BLUETOOTH device 401 to the first value.

Alternatively or additionally, at least one packet (of the one or more packet exchanges 415) that is sent by the BLUETOOTH device 401 has an MD bit set to the second value because the BLUETOOTH device 401 does not have data to send to the BLUETOOTH device 402 when the at least one packet is generated.

In examples in which the MD bit of one or more of the packets (of the one or more packet exchanges 415) that is sent by the BLUETOOTH device 401 is set to the second value, the BLUETOOTH device 402 setting the MD bit of each packet (of the one or more packet exchanges 415) that is sent by the BLUETOOTH device 402 to the first value (e.g., even when the BLUETOOTH device 402 does not have data to send to the BLUETOOTH device 401 when the packet is generated) prevents the BLUETOOTH connection event from terminating/closing.

The timing diagram 400 includes a packet 416 (e.g., a control procedure packet) sent by the BLUETOOTH device 402 to the BLUETOOTH device 401 in response to a last packet of the one or more packet exchanges 415. The packet 416 includes control information. For example, the packet 416 may include an LL_START_ENC_REQ (e.g., a start encryption request). Because the BLUETOOTH device 402 owes the BLUETOOTH device 401 a control procedure packet when the packet 416 is generated, the BLUETOOTH device 402 sets the MD bit of the packet 416 to the first value independent of whether the BLUETOOTH device 402 has data to send to the BLUETOOTH device 401 when the packet 416 is generated. To illustrate, in some examples, the BLUETOOTH device 402 does not have data to send to the BLUETOOTH device 401 (e.g., when the packet 416 is generated), yet the BLUETOOTH device 402 sets the MD bit of the packet 416 to the first value.

In examples in which the MD bit of the last packet (of the one or more packet exchanges 415) that is sent by the BLUETOOTH device 401 is set to the second value, the BLUETOOTH device 402 setting the MD bit of the packet 416 to the first value (e.g., even when the BLUETOOTH device 402 does not have data to send to the BLUETOOTH device 401 when the packet 416 is generated) prevents the BLUETOOTH connection event from terminating/closing.

The BLUETOOTH devices 401 and 402 are configured to operate according to a relevant protocol that indicates that a next control procedure packet (of the control procedure) after the packet 416 is to be sent by the BLUETOOTH device 401. In other words, the BLUETOOTH device 401 owes the BLUETOOTH device 402 a control procedure packet after the packet 416.

The timing diagram 400 includes one or more packet exchanges 418 of packets alternatively sent between the BLUETOOTH device 401 and the BLUETOOTH device 402. Because the BLUETOOTH device 401 owes the BLU- ETOOTH device 402 a control procedure packet, each packet (of the one or more packet exchanges 418) that is sent by the BLUETOOTH device 401 has an MD bit set to the first value independent of whether the BLUETOOTH device 401 has data to send to the BLUETOOTH device 402 when the BLUETOOTH device 401 generates the packet. In an example, the BLUETOOTH device 401 does not have data to send to the BLUETOOTH device 402 during the one or more packet exchanges 418, yet the BLUETOOTH device 401 sets the MD bit of each packet (of the one or more packet exchanges 418) that is sent by the BLUETOOTH device 401 to the BLUETOOTH device 402 to the first value.

Alternatively or additionally, at least one packet (of the one or more packet exchanges 418) that is sent by the BLUETOOTH device 402 has an MD bit set to the second value because the BLUETOOTH device 402 does not have data to send to the BLUETOOTH device 401 when the at least one packet is generated.

In examples in which the MD bit of one or more of the packets (of the one or more packet exchanges 418) that is sent by the BLUETOOTH device 402 is set to the second value, the BLUETOOTH device 401 setting the MD bit of each packet (of the one or more packet exchanges 418) that is sent by the BLUETOOTH device 401 to the first value (e.g., even when the BLUETOOTH device 401 does not have data to send to the BLUETOOTH device 402 when the packet is generated) prevents the BLUETOOTH connection event from terminating/closing.

The timing diagram 400 includes a packet 420 (e.g., a control procedure packet) sent by the BLUETOOTH device 401 to the BLUETOOTH device 402 in response to a last packet of the one or more packet exchanges 418. The packet 420 includes control information. For example, the packet 420 may include an LL_START_ENC_RSP (e.g., a start encryption response). Because the BLUETOOTH device 401 owes the BLUETOOTH device 402 a control procedure packet when the packet 420 is generated, the BLUETOOTH device 401 sets the MD bit of the packet 420 to the first value independent of whether the BLUETOOTH device 401 has data to send to the BLUETOOTH device 402 when the packet 420 is generated. To illustrate, in some examples, the BLUETOOTH device 401 does not have data to send to the BLUETOOTH device 402 (e.g., when the packet 420 is generated), yet the BLUETOOTH device 401 sets the MD bit of the packet 420 to the first value.

In examples in which the MD bit of the last packet (of the one or more packet exchanges 418) that is sent by the BLUETOOTH device 402 is set to the second value, the BLUETOOTH device 401 setting the MD bit of the packet 420 to the first value (e.g., even when the BLUETOOTH device 401 does not have data to send to the BLUETOOTH device 402 when the packet 420 is generated) prevents the BLUETOOTH connection event from terminating/closing.

The BLUETOOTH devices 401 and 402 are configured to operate according to a relevant protocol that indicates that a next control procedure packet (of the control procedure) after the packet 420 is to be sent by the BLUETOOTH device 402. In other words, the BLUETOOTH device 402 owes the BLUETOOTH device 401 a control procedure packet after the packet 420.

The timing diagram 400 includes one or more packet exchanges 422 of packets alternatively sent between the BLUETOOTH device 401 and the BLUETOOTH device 402. Because the BLUETOOTH device 402 owes the BLUETOOTH device 401 a control procedure packet, each packet (of the one or more packet exchanges 422) that is sent by the BLUETOOTH device 402 to the BLUETOOTH device 401 has an MD bit set to the first value independent of whether the BLUETOOTH device 402 has data to send to the BLUETOOTH device 401 when the BLUETOOTH device 402 generates the packet. In an example, the BLUETOOTH device 402 does not have data to send to the BLUETOOTH device 401 during the one or more packet exchanges 422, yet the BLUETOOTH device 402 sets the MD bit of each packet (of the one or more packet exchanges 422) that is sent by the BLUETOOTH device 402 to the BLUETOOTH device 401 to the first value.

Alternatively or additionally, at least one packet (of the one or more packet exchanges 422) that is sent by the BLUETOOTH device 401 has an MD bit set to the second value because the BLUETOOTH device 401 does not have data to send to the BLUETOOTH device 402 when the at least one packet is generated.

In examples in which the MD bit of one or more of the packets (of the one or more packet exchanges 422) that is sent by the BLUETOOTH device 401 is set to the second value, the BLUETOOTH device 402 setting the MD bit of each packet (of the one or more packet exchanges 422) that is sent by the BLUETOOTH device 402 to the first value (e.g., even when the BLUETOOTH device 402 does not have data to send to the BLUETOOTH device 401 when the packet is generated) prevents the BLUETOOTH connection event from terminating/closing.

The timing diagram 400 includes a packet 424 sent by the BLUETOOTH device 402 to the BLUETOOTH device 401 in response to a last packet of the one or more packet exchanges 422. The packet 424 includes control information that completes the 5-way encryption control procedure. For example, the packet 424 may include an LL_START_ENC_RSP (e.g., a start encryption response).

Because the packet 424 is a last packet the BLUETOOTH device 402 is configured to send to the BLUETOOTH device 401 during the control procedure (e.g., as defined by a relevant protocol), the BLUETOOTH device 402 sets the MD bit of the packet 424 to a value based on whether the BLUETOOTH device 402 has data to send to the BLUETOOTH device 401 when the packet 424 is generated. In an example, the BLUETOOTH device 402 does not have data to send to the BLUETOOTH device 401 when the packet 424 is generated. In this example, the BLUETOOTH device 402 sets the MD bit of the packet 424 to the second value.

In examples in which the MD bit of the last packet (of the one or more packet exchanges 422) that is sent by the BLUETOOTH device 401 is set to the second value and the MD bit of the packet 424 is set to the second value, the BLUETOOTH connection event will end.

Figure 5:
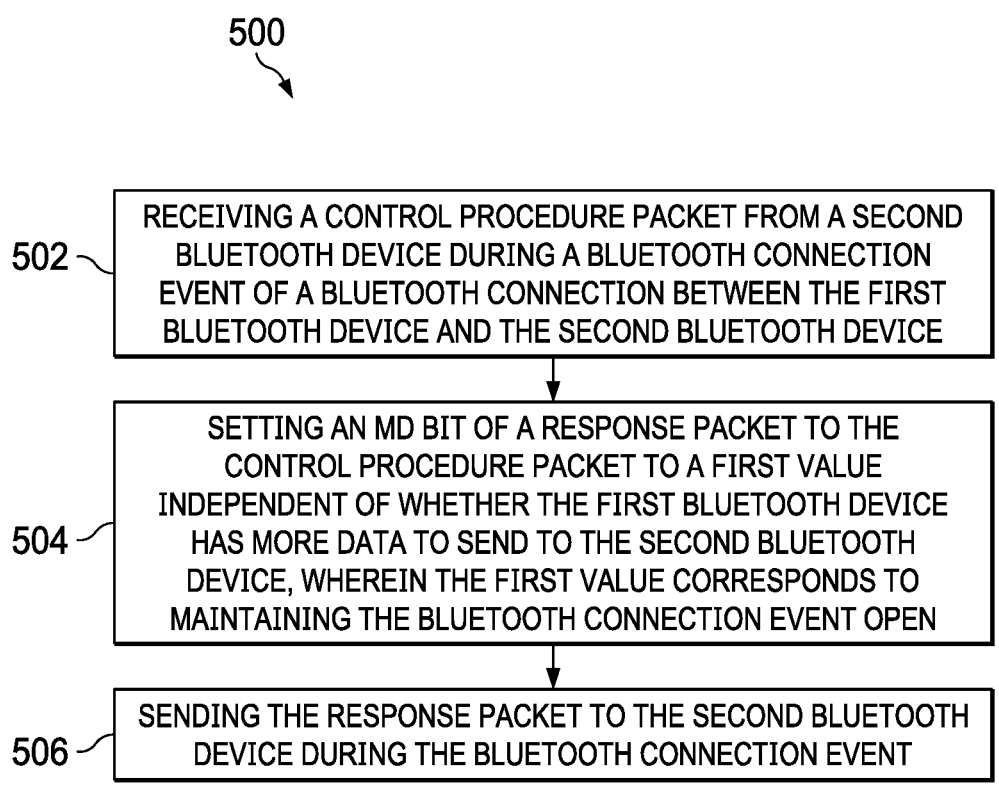
FIG. 5 is a flow diagram of a method in accordance with various examples.

FIG. 5 illustrates a flowchart of an example of a method implemented by a first BLUETOOTH device. The first BLUETOOTH device may correspond to the BLUETOOTH device 100 of FIG. 1.

The method 500 includes receiving, at 502, a control procedure packet from a second BLUETOOTH device during a connection event of a BLE connection between the first BLUETOOTH device and the second BLUETOOTH device. The control procedure packet may correspond to the control procedure packet 107 of FIG. 1, and the connection event may correspond to the BLUETOOTH connection event 102 of FIG. 1. In some examples, an MD bit of the control procedure packet is set to a second value indicating that the second BLUETOOTH device does not have more data to send. For example, the MD bit 109 of the control procedure packet 107 of FIG. 1 may be set to the second value 110 of FIG. 1.

The method 500 includes setting, at 504, an MD bit of a response packet to the control procedure packet to a first value independent of whether the first BLUETOOTH device has more data to send to the second BLUETOOTH device. The first value corresponds to maintaining the connection event open. For example, the response packet may correspond to the response packet 116 of FIG. 1, and the BLUETOOTH device 100 of FIG. 1 may set the MD bit 118 of FIG. 1 in the response packet 116 of FIG. 1 to the first value 119 as described above with reference to FIG. 1. In some examples, a data field of the response packet is empty as described above with reference to the response packet 116 of FIG. 1. In some examples, the MD bit of the response packet is set to the first value when a transmission data queue of the first BLUETOOTH device is empty as described above with reference to FIG. 1.

The method 500 includes sending, at 506, the response packet to the second BLUETOOTH device during the connection event. For example, the BLUETOOTH device 100 of FIG. 1 may send the response packet 116 to the BLUETOOTH device 101 of FIG. 1 during the BLUETOOTH connection event 102 as described above with reference to FIG. 1.

In some examples, the method 500 further includes receiving a second packet from the second BLUETOOTH device during the connection event based on the MD bit of the response packet being set to the first value. For example, the second packet may correspond to the second packet 120 of FIG. 1, and the BLUETOOTH device 100 of FIG. 1 may receive the second packet 120 of FIG. 1 from the BLUETOOTH device 101 of FIG. 1 during the BLUETOOTH connection event 102 of FIG. 1 as described above with reference to FIG. 1.

In some examples, the method 500 further includes generating a second packet to be sent to the second BLUETOOTH device during the connection event and subsequent to the response packet. The second packet includes control information responsive to the control procedure packet. For example, the second packet may correspond to the second response packet 123 of FIG. 1, and the second response packet 123 may include control information responsive to the control procedure packet 107 of FIG. 1 as described above with reference to FIG. 1.

Examples of the disclosure further include a computer program product comprising computer readable program instructions that, when executed by a processor, cause a BLUETOOTH device to execute functions, operations, or steps described herein. For example, the processor may correspond to the controller 112 of FIG. 1, and the functions or operations may include the functions or operations describe with reference to the BLUETOOTH device 100 of FIG. 1.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

While certain components may be described herein as being of a particular process technology, these components may be exchanged for components of other process technologies.

Modifications are possible in the described examples, and other examples are possible within the scope of the claims.

What is claimed is:

1. A first BLUETOOTH device, comprising:
   a transceiver configured to receive a control procedure packet from a second BLUETOOTH device during a BLUETOOTH connection event of a BLUETOOTH connection between the first BLUETOOTH device and the second BLUETOOTH device; and
   a controller coupled to the transceiver and configured to set a more data (MD) bit of a response packet to the control procedure packet to a first value independent of whether the first BLUETOOTH device has more data to send to the second BLUETOOTH device, wherein the first value corresponds to maintaining the BLUETOOTH connection event open,
   wherein the transceiver is further configured to send the response packet to the second BLUETOOTH device during the BLUETOOTH connection event.

2. The first BLUETOOTH device of claim 1, wherein a data field of the response packet is empty.

3. The first BLUETOOTH device of claim 2, wherein a MD bit of the control procedure packet is set to a second value indicating that the second BLUETOOTH device does not have more data to send.

4. The first BLUETOOTH device of claim 3, wherein the transceiver is further configured to receive a second packet from the second BLUETOOTH device during the BLUETOOTH connection event based on the MD bit of the response packet being set to the first value.

5. The first BLUETOOTH device of claim 1, wherein the controller is configured to generate a second packet to be sent to the second BLUETOOTH device during the BLUETOOTH connection event and subsequent to the response packet, and wherein the second packet includes control information responsive to the control procedure packet.

6. The first BLUETOOTH device of claim 1, further comprising a transmission data queue storing data for the first BLUETOOTH device to send to the second BLUETOOTH device, and wherein the controller is configured to set the MD bit of the response packet to the first value when the transmission data queue is empty.

7. The first BLUETOOTH device of claim 1, wherein the first value is one.

8. A non-transitory computer readable storage medium storing computer readable instructions that, when executed by a processor of a first BLUETOOTH device, cause the first BLUETOOTH device to:
   receive a control procedure packet from a second BLUETOOTH device during a BLUETOOTH connection event of a BLUETOOTH connection between the first BLUETOOTH device and the second BLUETOOTH device;

set a more data (MD) bit of a response packet to the control procedure packet to a first value independent of whether the first BLUETOOTH device has more data to send to the second BLUETOOTH device, wherein the first value corresponds to maintaining the BLUETOOTH connection event open; and send the response packet to the second BLUETOOTH device during the BLUETOOTH connection event.

9. The non-transitory computer readable storage medium of claim 8, wherein a data field of the response packet is empty.

10. The non-transitory computer readable storage medium of claim 9, wherein an MD bit of the control procedure packet is set to a second value indicating that the second BLUETOOTH device does not have more data to send.

11. The non-transitory computer readable storage medium of claim 10, wherein the computer readable instructions are further configured to cause the first BLUETOOTH device to receive a second packet from the second BLUETOOTH device during the BLUETOOTH connection event based on the MD bit of the response packet being set to the first value.

12. The non-transitory computer readable storage medium of claim 8, wherein the computer readable instructions are further configured to cause the first BLUETOOTH device to generate a second packet to be sent to the second BLUETOOTH device during the BLUETOOTH connection event and subsequent to the response packet, and wherein the second packet includes control information responsive to the control procedure packet.

13. The non-transitory computer readable storage medium of claim 8, wherein the computer readable instructions are further configured to cause the first BLUETOOTH device to set the MD bit of the response packet to the first value when a transmission data queue of the first BLUETOOTH device is empty.

14. The non-transitory computer readable storage medium of claim 8, wherein the first value is a 1.

15. A method performed by a first BLUETOOTH device, the method comprising:

receiving a control procedure packet from a second BLUETOOTH device during a BLUETOOTH connection event of a BLUETOOTH connection between the first BLUETOOTH device and the second BLUETOOTH device;

setting a more data (MD) bit of a response packet to the control procedure packet to a first value independent of whether the first BLUETOOTH device has more data to send to the second BLUETOOTH device, wherein the first value corresponds to maintaining the BLUETOOTH connection event open; and sending the response packet to the second BLUETOOTH device during the BLUETOOTH connection event.

16. The method of claim 15, wherein a data field of the response packet is empty.

17. The method of claim 16, wherein an MD bit of the control procedure packet is set to a second value indicating that the second BLUETOOTH device does not have more data to send.

18. The method of claim 17, further comprising receiving a second packet from the second BLUETOOTH device during the BLUETOOTH connection event based on the MD bit of the response packet being set to the first value.

19. The method of claim 15, further comprising generating a second packet to be sent to the second BLUETOOTH device during the BLUETOOTH connection event and subsequent to the response packet, wherein the second packet includes control information responsive to the control procedure packet.

20. The method of claim 15, further comprising setting the MD bit of the response packet to the first value when a transmission data queue of the first BLUETOOTH device is empty.

* * * * *